United States Patent [19]

Shires et al.

[11] Patent Number: 4,479,925
[45] Date of Patent: Oct. 30, 1984

[54] PREPARATION OF AMMONIA SYNTHESIS GAS

[75] Inventors: Philip J. Shires, Katy; John R. Cassata, Houston; Bernard G. Mandelik, Houston; Christiaan P. van Dijk, Houston, all of Tex.

[73] Assignee: The M. W. Kellogg Company, Houston, Tex.

[21] Appl. No.: 417,718

[22] Filed: Sep. 13, 1982

[51] Int. Cl.³ .............................................. C01C 1/04
[52] U.S. Cl. .................................. 423/359; 252/373; 252/376
[58] Field of Search ...................... 423/359, 360, 361; 252/376, 373

[56] References Cited

U.S. PATENT DOCUMENTS

| Re. 24,311 | 5/1957 | Mader | 48/196 |
|---|---|---|---|
| 3,264,066 | 8/1966 | Quartulli et al. | 23/212 |
| 3,442,613 | 5/1969 | Grotz | 23/199 |
| 3,584,998 | 6/1971 | Green | 23/199 |
| 3,795,485 | 3/1974 | Bogart | 23/262 |
| 4,079,017 | 3/1978 | Crawford et al. | 252/373 |
| 4,224,299 | 9/1980 | Barber et al. | 423/360 |
| 4,296,085 | 10/1981 | Banquy | 423/359 |
| 4,298,588 | 11/1981 | Pinto | 423/359 |
| 4,376,758 | 3/1983 | Pagani et al. | 423/359 |

FOREIGN PATENT DOCUMENTS

| 82691 | 7/1978 | Japan | 423/359 |
|---|---|---|---|
| 82690 | 7/1978 | Japan | 423/359 |

Primary Examiner—Gary P. Straub
Assistant Examiner—Wayne A. Langel

[57] ABSTRACT

Ammonia synthesis gas having excess nitrogen is produced in a reactor-exchanger primary reformer followed by an autothermal secondary reformer wherein process air for the latter is preheated by heat exchange with gas turbine exhaust and the primary reformer is heated by synthesis gas from the secondary reformer.

8 Claims, 1 Drawing Figure

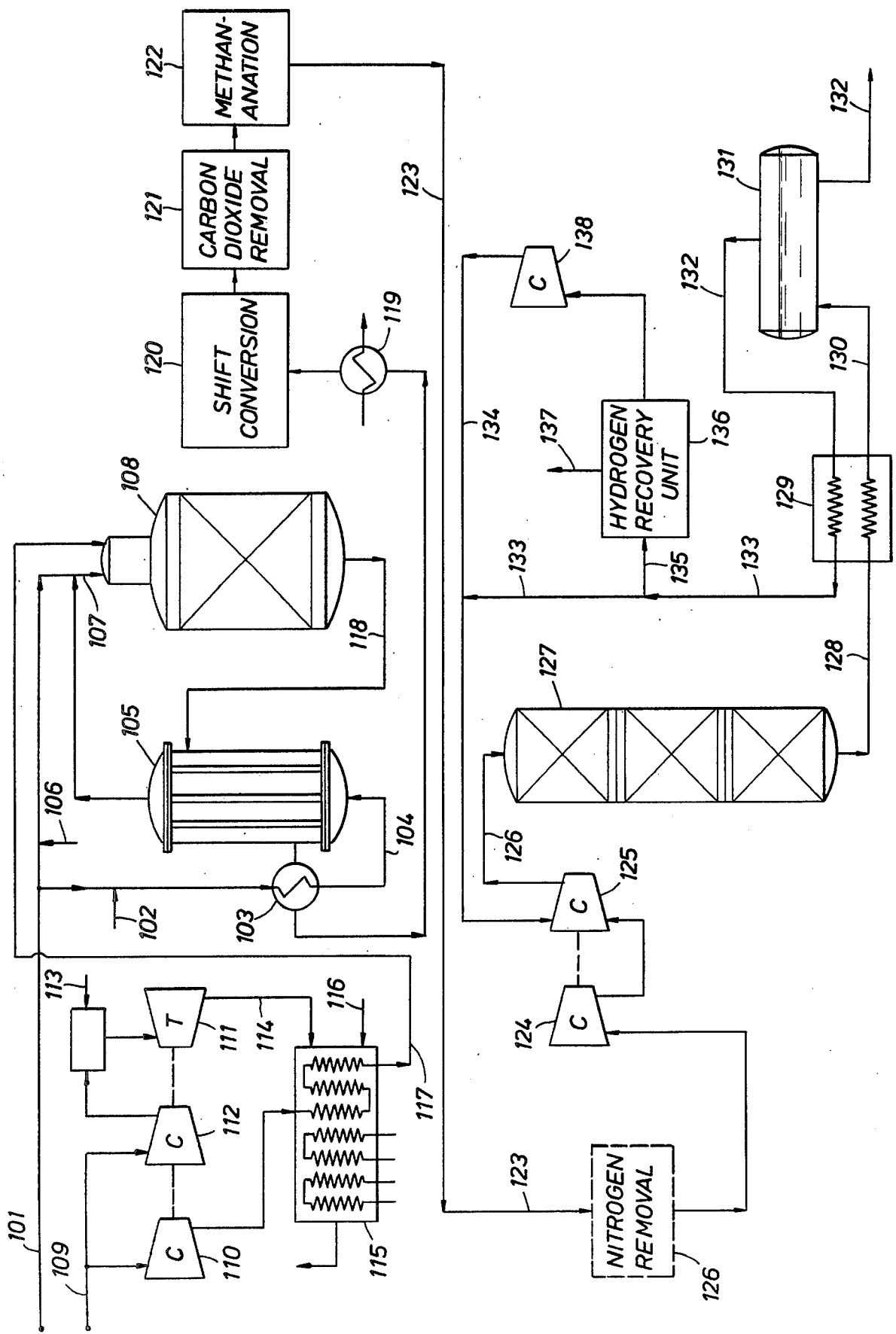

PREPARATION OF AMMONIA SYNTHESIS GAS

This invention relates to the production of ammonia from normally gaseous hydrocarbons such as natural gas and specifically relates to production of ammonia synthesis gas, i.e.—hydrogen and nitrogen, with reduced fuel requirements made possible by deletion of the fired primary reformer that, heretofore, has been employed in commercial practice.

The customary steps of primary and secondary reforming to produce ammonia synthesis gas are well known both technically and economically. From the latter viewpoint, these steps are recognized as controlling factors in determining the "feed and fuel" requirements for each unit of ammonia produced because both steps require heat from combustion of hydrocarbon for the endothermic reaction of steam with hydrocarbon feed.

Commercial primary reformers are fuel fired furnaces having large tubes filled with nickel-containing catalyst wherein approximately 55 volume percent of the fresh hydrocarbon feed is converted with added steam to hydrogen and carbon oxides. This primary reformed gas additionally contains unreacted steam and methane. The primary reformer is sometimes referred to herein as an endothermic, catalytic conversion zone operated under steam reforming conditions, but is more often referred to as the primary reformer.

Primary reformed gas is then passed to the secondary reformer which is typically a refractory-lined vessel filled with nickel-containing catalyst and, in contrast to the customary primary reformer, having no provision for supply of external heat. In secondary reforming, heat for the endothermic reaction of steam with methane is supplied by combustion of part of the primary reformed gas with externally supplied air, the latter also being the source of nitrogen in the desired synthesis gas. The secondary reformer is sometimes referred to herein as an adiabatic, catalytic conversion zone operated under autothermal reforming conditions but is more often referred to as the secondary reformer.

Raw, hot, synthesis gas from the secondary reformer is comprised of hydrogen, nitrogen, carbon oxides, unreacted steam, residual methane, and small quantities of noble gases. Commercially, this hot gas is heat exchanged with boiler feed water to raise turbine steam required for secondary reformer air compression and ammonia synthesis gas compression. Despite this use, practitioners have long desired, alternatively, to employ heat in the secondary reformer outlet gas in primary reforming service by use, for example, of a reactor-exchanger. To accomplish this more efficient use of "feed and fuel", they recognized that a significant amount of primary reforming duty had to be shifted to the secondary reformer which therefore required more fuel consumption and, therefore, more air. The additional air used results in nitrogen content of the synthesis gas in excess of the stoichiometric ratio for ammonia synthesis, however, the excess nitrogen may be removed by known means if desired.

Regrettably, the higher heat requirement in the secondary reformer coincides with loss of heat in the incoming air supply because secondary reformer air is usually heated by flue gas in the convection section of the primary reforming furnace. Deletion of that furnace also deletes that source of secondary reformer air preheat. The heat loss could be made up by more feed gas combustion in the secondary reformer but that imposes an additional feed and fuel penalty. Alternatively, the steam to carbon ratio to the secondary reformer can be increased to obtain an outlet equilibrium condition corresponding to the required production of hydrogen and carbon oxides, however, the increased steam requirement again imposes an additional feed and fuel penalty. Beyond that, equipment sizes must be increased to accommodate the resulting larger total gas volume.

An additional problem created by transferring duty from the primary to the secondary reformer is that considerable feed gas passes unreacted through the primary reformer. At desired primary reformer outlet operating temperature, the resulting unfavorable Boudouard equilibrium will most likely cause carbon laydown on the reforming catalyst. Correction of this condition by increasing the steam amount again results in feed and fuel penalty.

It is, therefore, an object of this invention to utilize heat from secondary reforming in the production of ammonia synthesis gas in the primary reforming step under such conditions that the entire heat of conversion in the primary reformer is furnished from the secondary reformer while at the same time minimizing feed and fuel requirements of the process.

According to the invention, ammonia synthesis gas is produced by introducing normally gaseous hydrocarbon fresh feed and steam to an endothermic, catalytic conversion zone operated under primary reforming conditions to produce primary reformed gas which is then introduced with air to an adiabatic, catalytic conversion zone operated under autothermal steam reforming conditions to produce raw, hot, ammonia synthesis gas which, in turn, is passed to the endothermic catalytic conversion zone in indirect heat exchange with normally gaseous hydrocarbon fresh feed and steam therein to provide all of the heat required for conversion in the endothermic zone. Raw ammonia synthesis gas relatively depleted in heat is then recovered from the endothermic catalytic conversion zone.

Further, air required for operation of the adiabatic zone is supplied by a gas turbine driven centrifugal compressor. The gas turbine exhaust is indirectly heat exchanged against the secondary reformer air and the heated compressed air, then introduced to the adiabatic, catalytic conversion zone in addition to primary reformed gas.

The endothermic catalytic conversion zone operates under primary reforming conditions which typically employ inlet pressure in the range from 25 to 50 bars and inlet temperature from 450° C. to 700° C. with a steam to $C_1$ ratio of from 2.5 to 4.5 based on moles of steam per carbon atom in the fresh feed. The endothermic zone does not utilize a fired tube reforming furnace as in classic practice but employs a reactor-heat exchanger within the broad type of shell and tube exchangers in which the tube diameters are sufficiently large to accommodate the required volume of nickel-containing reforming catalyst. A reactor-exchanger of the type described in U.S. Pat. No. 4,127,389 may be employed. Outlet pressure of the primary reformer is slightly lower than the inlet pressure as may be expected from pressure drop of reactants through the catalyst tubes. Primary reformer outlet temperature is in the range from 680° C. to 790° C. This outlet temperature range is lower than usual commercial practice and is selected to limit the extent of conversion in the primary reformer and, accordingly, increase the secondary reformer duty.

The adiabatic, catalytic conversion zone, while of generally conventional design, operates under autothermal reforming conditions that are specialized including inlet feed temperature substantially corresponding to the cooler than normal primary reformer outlet temperature and excess flow of air that is sufficient to provide the increased requirement of combustion heat and indicated by stoichiometric excess of nitrogen in the raw ammonia synthesis gas of from 25 to 130 mole percent. Most importantly, the amount of fuel burned for heat in the secondary reformer and the amount of steam otherwise required to maintain favorable outlet gas equilibrium is minimized by introducing heated compressed air to the secondary reformer at a critically high temperature in the range from 700° C. to 900° C. which, in combination with other conditions, results in a secondary reformer outlet temperature in the range from 850° C. to 1000° C. The latter temperature is sufficient for primary reforming duty while overall secondary reformer conditions are economic in respect of feed and fuel requirement.

As recited above, secondary reformer air is furnished by a centrifugal compressor driven by a gas turbine. Proper matching of gas turbine to the total air compression requirement, i.e.—secondary reformer air and gas turbine combustion air results in a turbine exhaust gas at about 540° C. which is too low for heating secondary reformer air to the required temperature. The turbine exhaust gas temperature is therefore, raised to a temperature in the range from 860° C. to 1060° C. preferably by supplemental firing upstream of the secondary reformer air preheat coil in the turbine exhaust gas heat exchange zone. In the downstream, cooler portion of this zone, turbine exhaust gas is further employed in lower temperature services such as boiler feed water heating, hydrocarbon feed heating, and initial air preheating.

In a preferred embodiment of the invention, total fresh hydrocarbon feed to the process is divided between the primary and secondary reformers while, at the same time, maintaining the steam to $C_1$ ratio in the primary within the previously recited range from 2.5 to 4.5. As compared with conventional practice, the primary reforming steam requirement is reduced because of less hydrocarbon feed and yet the relatively high steam to $C_1$ ratio ensures carbon-free operation. High steam to $C_1$ ratio in the primary reformer does not inflict a feed and fuel penalty since unreacted steam passes, as part of the primary reformed gas, to the secondary reformer where it is combined with the remaining portion of fresh hydrocarbon feed. The secondary reformer, therefore, is operated with an overall steam to $C_1$ ratio in the range of 2 to 3 based on hydrocarbon and steam in the primary reformed gas, fresh hydrocarbon feed to the secondary, and some steam introduced with the heated, compressed, secondary reformer air to prevent hydrocarbon backflow.

Preferably, the allocation of fresh hydrocarbon feed between the primary and secondary zone is in a ratio from 1:1 to 3:1, most preferably, with fresh feed to the primary reformer being approximately twice as much as that to the secondary reformer. Maintenance of steam to $C_1$ ratio of the primary within the most preferred range from 3 to 4 under these split feed conditions permits limitation of the overall steam to $C_1$ requirement for the process, i.e.—both endothermic and adiabatic conversion zones, to an economical value of approximately 2.5.

The attached drawing is a flow diagram of a process for carrying out the invention. In addition to showing a preferred embodiment of the invention for production of ammonia synthesis gas, the flow diagram illustrates the integration of synthesis gas generation with known downstream process steps employed in the production of ammonia.

Referring to the drawing, natural gas which has been desulfurized and preheated is introduced to the process through line 101. A portion of the gas is combined with steam introduced through line 102 and the resulting mixed feed is preheated to desired reforming temperature in feed-effluent exchanger 103 and passed via line 104 to the tube side of reactor-heat exchanger 105 which is an endothermic catalytic conversion zone operated under steam reforming conditions. Primary reformed gas from reactor-exchanger 105, the sole source of such gas, is then combined with the balance of fresh feed from line 101 and additional steam introduced through line 106 and introduced via line 107 to secondary reformer 108 which is an adiabatic catalytic conversion zone operated under autothermal reforming conditions. That is to say, the required endothermic heat of reaction is internally generated by partial oxidation of incoming methane and, to lesser extent, combustion of hydrogen. The secondary reformer is a refractory-lined pressure shell having mixing and combustion zones in the upper part thereof and chromia and nickel-containing catalyst in the main body of the vessel.

Secondary reformer air is supplied from line 109 to centrifugal compressor 110 driven by gas turbine 111. Turbine air is supplied to compressor 112 where it is compressed and employed as combustion air for turbine fuel introduced through line 113. After extraction of shaft work by turbine 111, hot exhaust gas from the turbine is passed via line 114 to turbine gas exxchanger 115 which is an indirect heat exchange zone equipped in the inlet portion thereof with means for combustion of supplementary fuel introduced through line 116 to increase temperature of the turbine exhaust gas. Compressed air from centrifugal compressor 110 is passed to an air preheat coil in the upstream or hot end of turbine gas exchanger 115 where it is indirectly heat exchanged with turbine exhaust gas at an elevated temperature and raised to a temperature above that of the primary reformed gas. Thus heated compressed air is then introduced to secondary reformer 108 via line 117 for reaction and combustion with primary reformed gas and fresh feed introduced through line 107. The quantity of heated compressed air supplied is substantially in excess of that required to form ammonia synthesis gas in the conventional $H_2:N_2$ ratio of about 3:1.

Raw, hot, ammonia synthesis gas from secondary reformer 108 is introduced via line 118 to the shell side of reactor-exchanger 105 where it passes counter-currently to reactant flow within the catalyst tubes and is thus partially cooled. The resulting raw ammonia synthesis gas containing hydrogen, carbon oxides, nitrogen in excess of ammonia stoichiometry, residual methane, and small amounts of noble gases is further cooled in feed-effluent exchanger 103 and steam boiler 119.

The raw synthesis gas is subsequently treated in known process steps of shift conversion 120, carbon dioxide removal 121, and methanation 122 and then passed through line 123 to synthesis fresh gas compressor 124 and recycle gas compressor 125 wherein the pressure is elevated to synthesis pressure selected for the particular synthesis catalyst and synthesis loop design employed. The synthesis gas may first be processed through nitrogen removal step 126 for partial or complete removal of excess nitrogen by, for example, a pressure swing absorption system. Preferably, nitrogen in excess of that desired in the synthesis loop is removed in a purge stream from the synthesis loop as later described. In this preferred mode of operation, ammonia synthesis gas to the fresh gas compressor 124 will contain hydrogen and nitrogen in the approximate molar ratio of 2 to 1.

The synthesis loop comprises recycle gas compressor 125, catalytic ammonia converter 127, and means for recovering ammonia product. Fresh synthesis gas is combined with recycle gas in compressor 125 and introduced through line 126 to the catalytic ammonia converter 127. The converter design is based on the overall loop design, choice of synthesis catalyst, synthesis gas composition, and volume of gas being processed. A representative ammonia converter of radial design and equipped for interbed cooling is described in U.S. Pat. No. 4,230,669. Reaction gas from the converter containing ammonia and unreacted synthesis gas is passed via line 128 to refrigeration exchanger 129 where the stream is cooled below the condensation temperature of ammonia. The cooled stream is then passed through line 130 to ammonia separator 131 from which liquid ammonia product is removed via line 132. From the top of the separator, cold, ammonia-depleted synthesis gas flows through line 132 back to refrigeration exchanger 129 in indirect heat exchange with reaction gas and is returned via lines 133 and 134 to recycle gas compressor 125 thus completing the synthesis loop.

A purge stream 135 is taken from line 133 and processed in hydrogen recovery unit 136. This may be a semi-permeable membrane separation device but is preferably a cryogenic gas separation process. Inert gases including nitrogen, argon, and methane are separated in the hydrogen recovery unit and discharged through line 137 for use as turbine fuel 113 and supplementary fuel 116 previously described. Hydrogen-rich gas recovered from the unit is recompressed in compressor 138 and recombined with recycle gas in line 134 of the synthesis loop.

We claim:

1. A process for producing ammonia synthesis gas which comprises:
    (a) introducing normally gaseous hydrocarbon fresh feed and steam to an endothermic, catalytic conversion zone operated under steam reforming conditions to produce primary reformed gas containing hydrogen, carbon oxides, methane, and steam;
    (b) compressing air by centrifugal means driven by a fuel gas turbine and heating the compressed air to a temperature in the range of from 700° C. to 900° C. by indirect heat exchange with exhaust gas from the gas turbine;
    (c) introducing the primary reformed gas and the heated compressed air from step (b) to an adiabatic, catalytic conversion zone operated under autothermal reforming conditions to produce raw, hot, ammonia synthesis gas;
    (d) passing said raw, hot, ammonia synthesis gas to the endothermic catalytic conversion zone in indirect heat exchange with the normally gaseous hydrocarbon and steam therein to provide the entire heat of conversion in the endothermic catalytic conversion zone; and
    (e) recovering raw ammonia synthesis gas from the endothermic catalytic conversion zone.

2. The process of claim 1 wherein the steam to $C_1$ ratio in respect to fresh feed introduced to the endothermic, catalytic conversion zone is from 2.5 to 4.5 and normally gaseous hydrocarbon fresh feed is introduced to the adiabatic, catalytic conversion zone in admixture with primary reformed gas and supplemental steam such that the overall steam to $C_1$ ratio in the adiabatic, catalytic conversion zone based on available hydrocarbon is from 2 to 3.

3. The process of claim 2 wherein the fresh feed introduced to the endothermic, catalytic conversion zone and the fresh feed introduced to the adiabatic catalytic conversion zone are in the ratio from 1:1 to 3:1.

4. The process of either claim 1 or claim 2 wherein exhaust gas from the gas turbine is additionally heated by combustion of supplementary fuel added thereto prior to indirect heat exchange with the compressed air.

5. The process of either claim 1 or claim 2 wherein raw ammonia synthesis gas recovered from the endothermic catalytic conversion zone is passed in indirect heat exchange with at least a portion of the fresh feed introduced to the endothermic, catalytic conversion zone.

6. The process of claim 2 which additionally comprises:
    (a) treating raw ammonia synthesis gas by the steps of shift conversion, methanation, and carbon dioxide removal to produce treated ammonia synthesis gas;
    (b) compressing said treated ammonia synthesis gas and introducing the gas to an ammonia synthesis loop comprising a catalytic ammonia converter, means for recovering ammonia product, and recycle gas compression means; and
    (c) recovering ammonia product.

7. The process of claim 6 wherein nitrogen is removed from said treated ammonia synthesis gas prior to compressing the ammonia synthesis gas.

8. The process of claim 6 wherein a purge gas containing hydrogen, nitrogen, and methane is withdrawn from the ammonia synthesis loop and a hydrogen-rich stream is recovered from the purge stream and reintroduced to the ammonia synthesis loop.

* * * * *